United States Patent
Korber et al.

(10) Patent No.: US 11,811,916 B2
(45) Date of Patent: Nov. 7, 2023

(54) METHOD FOR SECURING DATA FLOWS BETWEEN A COMMUNICATION EQUIPMENT AND A REMOTE TERMINAL, EQUIPMENT IMPLEMENTING THE METHOD

(71) Applicant: SAGEMCOM BROADBAND SAS, Rueil Malmaison (FR)

(72) Inventors: Nicolas Korber, Rueil Malmaison (FR); Michaël Thien Bao Nguyen Dinh Hien, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 105 days.

(21) Appl. No.: 17/096,412

(22) Filed: Nov. 12, 2020

(65) Prior Publication Data

US 2021/0167951 A1 Jun. 3, 2021

(30) Foreign Application Priority Data

Nov. 29, 2019 (FR) ...................................... 1913458

(51) Int. Cl.
*H04L 9/08* (2006.01)
*H04L 9/14* (2006.01)
*H04L 29/06* (2006.01)
*H04L 9/32* (2006.01)
*H04L 9/40* (2022.01)

(52) U.S. Cl.
CPC .............. *H04L 9/0825* (2013.01); *H04L 9/14* (2013.01); *H04L 9/3268* (2013.01); *H04L 63/0428* (2013.01)

(58) Field of Classification Search
CPC ....... H04L 9/0825; H04L 9/14; H04L 9/3268; H04L 63/0428
See application file for complete search history.

(56) References Cited

U.S. PATENT DOCUMENTS

| 6,496,858 | B1 | 12/2002 | Frailong et al. |
| 6,981,138 | B2 * | 12/2005 | Douceur ............... H04L 9/0825 713/153 |

(Continued)

OTHER PUBLICATIONS

NWA5000/WAC6500 Series, ZyXEL, Edition 1, Nov. 2014; 229 pages. (Year: 2014).*

(Continued)

*Primary Examiner* — Yonas A Bayou
(74) *Attorney, Agent, or Firm* — Williams Mullen; R. Brian Drozd

(57) ABSTRACT

A method for securing data flows in a communication device configurable from a remote terminal, the method comprising steps of recording a first encryption key in a memory of the device, the generation, from the first key, of a public key and of a private key corresponding to the public key, the reception of a request for securing sent by the remote terminal and a sending of the public key to the remote terminal in response to the request for securing, the operations of receiving the request and of sending the public key being performed when the device and the terminal are connected to the same local network. Another object of the invention is a communication device configured to implement the method described.

11 Claims, 3 Drawing Sheets

(56) References Cited

U.S. PATENT DOCUMENTS

| | | | | |
|---|---|---|---|---|
| 7,289,632 B2* | 10/2007 | Buer | ............... | H04L 63/061 |
| | | | | 713/168 |
| 7,472,412 B2* | 12/2008 | Wolf | ............... | H04L 41/0213 |
| | | | | 370/254 |
| 8,713,309 B2* | 4/2014 | Buer | ............... | H04L 63/061 |
| | | | | 713/168 |
| 9,264,223 B2* | 2/2016 | Buer | ............... | H04L 63/04 |
| 9,363,481 B2* | 6/2016 | Grigorovitch | ............... | H04L 63/08 |
| 2002/0138722 A1* | 9/2002 | Douceur | ............... | H04L 9/0825 |
| | | | | 713/153 |
| 2004/0158708 A1* | 8/2004 | Peyravian | ............... | H04L 9/3236 |
| | | | | 713/176 |
| 2007/0158708 A1* | 7/2007 | Shibayama | ............... | H01L 31/102 |
| | | | | 257/E31.038 |

OTHER PUBLICATIONS

Jul. 13, 2020 Search Report issued in French Patent Application No. 1913458.

"Remote Management;" http://www.zyxel.ch/de/support/download/58479_1; Jun. 1, 2010; pp. 1-3.

* cited by examiner

METHOD FOR SECURING DATA FLOWS BETWEEN A COMMUNICATION EQUIPMENT AND A REMOTE TERMINAL, EQUIPMENT IMPLEMENTING THE METHOD

TECHNICAL FIELD

The present invention relates to devices for computer networks. The invention relates more particularly to the remote configuration of communication devices intended for connecting devices to a computer network, such as gateways, for example.

PRIOR ART

Devices adapted for allowing a connection to a computer network, such as a network gateway, a router, a data storage device or a printing device, by way of non-limitative examples, frequently allow remote configuration of some of their operating parameters. Such a remote device configuration, performed by means of a remote configuration terminal, frequently uses a management interface for entering or modifying parameters useful to the functioning of the device. Thus, by way of example, it may be useful to be able to connect to an internet access gateway with a view to configuring operating parameters such as a list of client devices enabled to connect, a wireless local network configuration, some operating schedules of a wireless local network or parameters related to a parental control of accesses made. The remote configuration terminal may be a computer, a smartphone, a tablet or any other device compatible in terms of exchange protocols and configured to connect to the device to be configured. The configuration of devices remotely frequently uses an embedded server, referred to as a "web server", which makes it possible to view the modifiable parameters, from a configuration terminal, and to enter new parameter values by means of a graphical interface (a so-called "user" interface) displayed on the configuration terminal. The advantage of a use via a web server operating from the device to be configured is that it is possible to view and modify configuration parameters from a remote configuration terminal using a web-server client application, in other words a browser (referred to as an "internet browser"). If a configuration can be achieved when the configurable device and the configuration terminal are connected by a physical link such as a cabled interface using an Ethernet communication protocol, for example, the massive use of wireless connections, even in a local context, weakens the reliability of the exchanges. Thus, even by being physically close to a device to be configured, a non-secure wireless connection does not guarantee that the destination device that is making exchanges with a view to a configuration is the device actually targeted and identity theft is always possible. For example, identity theft may be implemented from a third-party device within range of a device to be configured and a configuration terminal. Such an attack is well known and uses an impersonation technique commonly referred to as "man-in-the-middle attack". According to this technique, the third-party device, positioned at the middle of the exchanges between the device to be configured and the configuration terminal, passes itself off as the device to be configured in respect of the terminal, and as the terminal in respect of the device to be configured. In this configuration, neither the device to be configured nor the configuration terminal can detect the presence of a middle device, able to receive sensitive information and to make devious use thereof. To solve this problem during exchanges on the internet, authentication and encryption methods are frequently used, aimed on the one hand to ensure that exchanges are indeed taking place with a target device and that they can be encrypted so as to prevent the interception, by a third-party device, of sensitive data passing between two devices.

Techniques exist for being free from such vulnerabilities. It is for example possible to create secure access using a network portion known as "DMZ", the abbreviation of "demilitarised zone", combined with a relay server, the whole being based on an HTTPS secure exchange protocol between a web server and a web client. The HTTPS protocol and developments thereof use secure exchanges. HTTPs is a secure hypertext transfer protocol using an encryption layer. This solution does however require additional network architecture elements for implementing the demilitarised zone and the relay server. Another technique exists that uses a parallel communication link for dispatching an authentication message, such as the sending of an SMS (from the abbreviation for "short message system").

Other techniques exist that aim to use third-party services making available authenticity certificates for devices using a web server. The third-party service distributes authenticity certificates for devices that it guarantees. Such certificates are verifiable by devices intended to connect to a certified web server, such as a configuration terminal for example. A main drawback is that such sending of a certificate is performed in relation to a domain name. However, devices for connection to a computer network, such as for example a gateway, are usually not associated with the domain names. These devices are generally identified solely by means of an IP (Internet Protocol) address, this address being liable to be modified, sometimes regularly. Furthermore, use of such a service appears to be complex for devices for connection to a network already deployed on the ground and not being natively designed to do this. Finally, a configuration or reconfiguration according to factory-defined parameters is sometimes required for devices for connection to a network, which there also would make the use of a certificate distribution by a third party complex since a return to factory-defined parameters would break the certification chain created and would then require a new certification. The complexity of use of such third-party authentication services is not adapted to the securing of exchanges between devices for connection to a network widely deployed on the ground and terminals. In addition, such a service would not meet the risk of identity theft in a local network not connected to the internet and using wireless connections. This situation can therefore be improved.

DISCLOSURE OF THE INVENTION

The present invention aims in particular to secure the authentication of exchanges with a communication device and the securing of data flows with this same device, from a remote configuration terminal.

To this end, the object of the invention is to propose a method for securing a data flow in a communication device that can be configured from a remote configuration terminal, the method comprising the steps of:
  recording a first encryption key in a memory of said device (100),
  generating and recording a second encryption key, referred to as a private key, and a third encryption key, referred to as a public key, the public key being inserted in an authenticity certificate signed by the first key, the public key being able to be used for the encryption of a data flow that can be deciphered by means of the private key, receiving, from the remote terminal, a request with a view to securing exchanges between said device and the remote terminal, checking that said request is received via said first interface, if said request is received via said first interface, sending, by said device, the public key to the remote terminal, in response to the request and enabling remote configuration of said device via at least the second interface, from the data flow encrypted by means of said public key.

Advantageously, it is possible, by means of the transmission of a public key that can be used for encrypting a data flow decipherable by means of the private key, to perform an authentication of the communication device that can be configured remotely by the configuration terminal. To do this, an authentication certificate, signed by the first key, is addressed with the public key. This authentication certificate is generated at the same time as the public key. This certificate contains information such as for example the length of life thereof, as well as information representative of the communication equipment that sends it. Just as advantageously, it is possible to use the public key received for the encryption of all or some of the data to be sent to the remotely configurable communication device.

The term private local network is to be interpreted here as a LAN (the abbreviation for local area network) that connects devices or computers in the same limited area such as a dwelling, a residential building or property, a company, a laboratory, a school or a university, in contradistinction to a wide area network (WAN) that connects devices or computers situated in an extended territory, typically a region, a country, a set of countries, or even on a planetary scale, such as the internet for example.

In a WAN, devices or computers may be respectively connected to branches of different LAN networks and connected together by means of intermediate devices such as routers, connection nodes or domestic gateways for example.

The method according to the invention may also comprise the following features, considered alone or in combination:
 The method comprises a step of authentication of the communication device vis-à-vis the remote configuration terminal or vice versa.
 The method comprises a step of encryption of a data flow to be transmitted, between the communication device and the remote terminal, the encryption being performed by means of the public key.
 The step of sending the public key to the remote configuration terminal further comprises a sending of the public key to a remote storage device.

Another object of the invention is to propose a communication device that can be configured from a remote terminal, the communication device being configured to
 i) record a first encryption key in a memory of said device,
 ii) generate and record a second encryption key, referred to as a private key, and a third encryption key, referred to as a public key, the public key being inserted in an authenticity certificate signed by the first key, and the public key being able to be used for the encryption of a data flow that can be deciphered by means of the private key,
 iii) receive, from the remote terminal, a request with a view to securing exchanges between said device and the remote terminal via a private local network,
 iv) send the public key from said device to the remote terminal via a private local network.

The communication device may further comprise one or more of the following features, taken alone or in combination:
 The communication device is intended for executing gateway functions of connection between the local network and an extended network.
 The communication device is configured to make a modification of at least one configuration register from received data encrypted by the execution of an encryption algorithm using the public key and decipherable by the execution of an algorithm of decryption using the private key.
 The communication device is configured for the implementation of a web server allowing a modification of at least one configuration register via the use of a graphical interface displayed on the remote terminal.
 The graphical interface, controlled by the communication device, is adapted for entering a command securing data flows between the communication device and the remote configuration terminal.

Another object of the invention is a communication system comprising a remotely configurable communication device and a remote configuration terminal, the communication device and the remote configuration terminal being configured for being connected to the same network and for:
 recording, by the device, a first encryption key in a memory of the device,
 generating and recording, by the device, a second encryption key, referred to as a private key, and a third encryption key, referred to as a public key, the public key being inserted in an authenticity certificate signed by the first key, the public key being able to be used for the encryption of a data flow that can be deciphered by means of the private key,
 receiving, by the device and from the configuration terminal, a request with a view to securing exchanges between the communication device and the remote configuration terminal,
 checking, by the communication device, that the request is received via the first interface configured for connection to a local network,
 if said request is received via said first interface, sending, by the communication device, the public key to the remote configuration terminal, in response to the request and enabling a remote configuration of the communication device via at least the second interface from data flows encrypted by means of the public key.

Another object of the invention is a computer program product comprising program code instructions for executing the steps of the aforementioned method, when the program is executed on a computer, as well as an information storage device comprising such a computer program product. The term computer is to be interpreted here broadly and as applicable to any electronic device comprising a control unit, one or more memory modules and one or more network interface modules adapted for connecting remote devices such as a remote-configuration terminal, apart from the usual set of circuits useful to the functioning of the aforementioned elements (power supply, reset circuit, clock circuits, etc.).

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
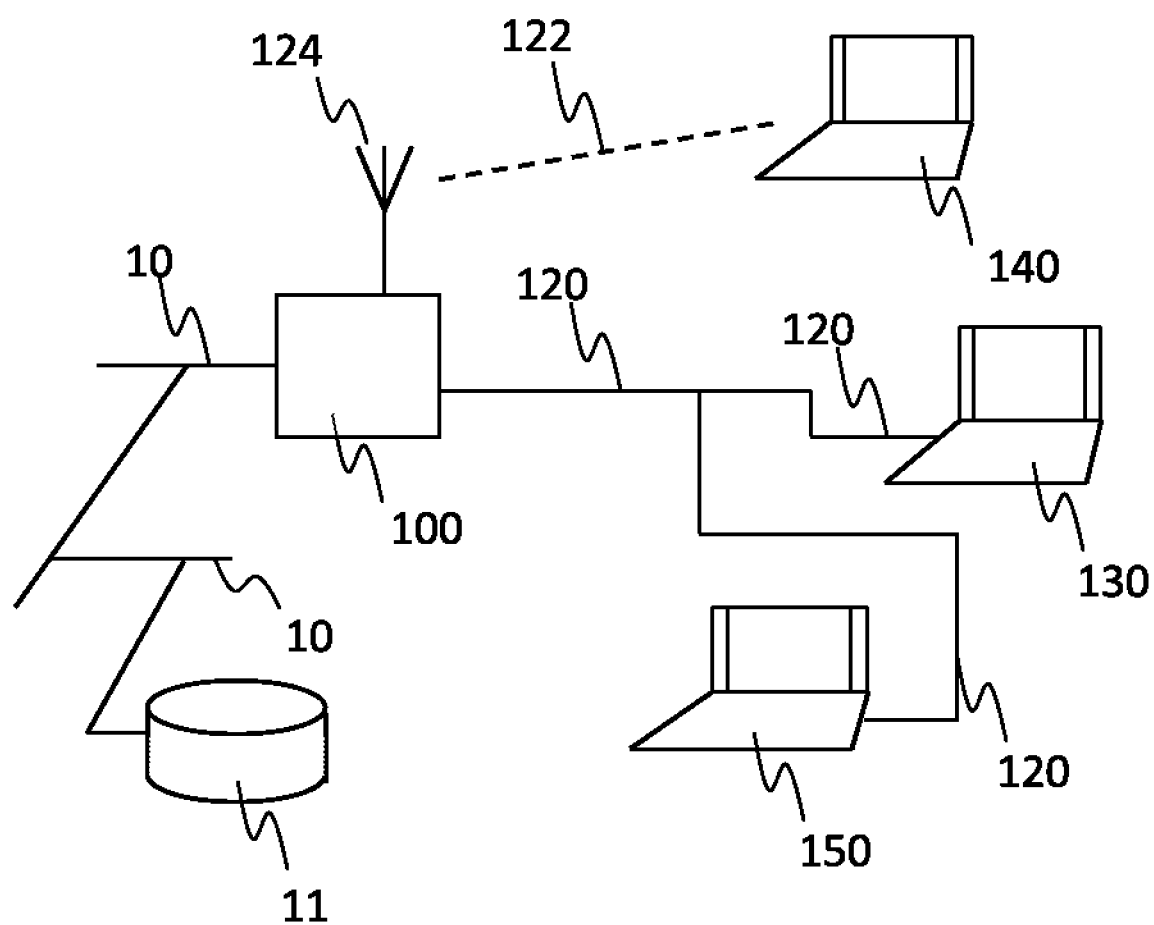
FIG. 1 illustrates a communication device performing access gateway functions between a first private local network LAN and a second network, implementing a method for securing data flows transmitted between a remote configuration terminal and a communication device, according to a particular and non-limitative embodiment of the invention.

FIG. 1 illustrates a communication device 100 adapted for implementing interconnection gateway functions between a network 10 and a private local network 120.

The private local network 120 is a network of the LAN type. According to a preferred embodiment of the invention, the network 10 is an extended network of the WAN type. According to a variant, the network 10 may be a local network of the LAN type. The communication device comprises an interface for wireless connection to the LAN network 120 by means of an antenna system 124. This wireless connection interface is configured for establishing a wireless connection 122 between the communication equipment 100 and a remote computer 140. The LAN network 120 is configured for interconnecting a plurality of devices. According to the example described, the LAN network 120, of the local private type, is configured for interconnecting the communication device 100, the computer 130, the computer 140 and a remote configuration terminal 150.

Thus, the communication device 100 performing network gateway functions between the network 100 and the network 10 allows for example the establishment of data flows between a data storage device 11 connected to the extended network 10 and the computer 130 connected to the private local network 120. The configuration terminal 150 is for example a computer configured to execute a web browser application able to connect to a remote web server identified by its IP address or by a domain name. When the remote web server is identified by a domain name, the domain name is resolved by a remote domain name server (DNS), not shown in the figure. The communication device 100 performing network gateway functions can be configured remotely. Some operating parameters of the communication device 100 can be modified by modifications of values or of data accessible via configuration registers. These data are for example operating time ranges of a Wi-Fi interface allowing a wireless connection of a computer to the communication device 100 with a view to access to remote servers accessible by means of the WAN network 10. In other words, it is a case of defining, for example, time ranges allowing access to the internet for one or more computers connected to the private local network 120. These data are stored in one or more non-volatile memories when the communication device 100 is powered up. Thus a configuration can be re-established after the communication device 100 is powered up again. The configuration of the communication device 100 is simplified by the making available of a configuration interface, also referred to as a management interface or configuration management interface, implemented in the communication device 100, operating under the control of an internal control unit, in the form of a web server implementing a non-secure hypertext protocol (the HTTP protocol for example). The web server embedded in the communication device 100 makes it possible to display configuration menus in the form of a graphical user interface on a screen of the remote configuration terminal computer 150 executing a web browser application, connected to the configuration web server of the communication device 100. For example, a user wishing to modify operating parameters of the communication device 100 will use the web browser application of the remote configuration terminal 150 and will target the web server by identifying it by its IP address: 192.168.1.1. This is because the IP address 192.168.1.1 is broadly defined as giving access to configuration parameters of a communication device of the network gateway type that can be used for the interconnection of a local private network LAN, cabled or wireless, and an extended network WAN.

The various configuration options for the communication device 100 are thus made accessible from the remote configuration terminal 150, by means of configuration menus and entry fields shown and implemented via the graphical interface displayed by the web browser of the remote configuration terminal 150. The remote configuration terminal 150 comprises at least one display screen and an input interface for entering parameters, such as, for example, a keypad, a mouse, a mousepen or a touch-sensitive device, optionally combined with the screen. The use of configuration menus is implemented by exchanges between the web server of the communication device 100 and the web browser application of the remote configuration terminal 150. These exchanges constitute flows of data between the communication device 100 and the remote configuration terminal 150.

According to the preferred embodiment, the exchanges useful to the configuration of the communication device 100 are made in accordance with a hypertext communication protocol HTTP or any one of the updates thereof. According to a variant, the connection between the communication device 100 and the remote configuration terminal 150 is established using a secure communication protocol of the SSH type or any one of the updates thereof.

According to a preferred embodiment of the invention, the configuration interface (or management interface) comprises a configuration field adapted for implementing a method for securing data flows between the configuration terminal 150 and the communication device 100 in the form of a box to be ticked combined with an identification of the function of the box to be ticked (that is to say the implementation of a securing of the data flows). Advantageously, the securing of the data flows implemented according to the invention comprises the authentication of the communication device 100 by the configuration terminal 150 and the encryption of the data flows between these two devices in order to eliminate risks of interception of sensitive data, and to guarantee that the device to which the configuration terminal 150 is connected is actually the communication device 100 rather than another device, situated within range of the configuration terminal 150 and/or of the communication device 100 and performing an attack of the man-in-the-middle attack type.

The communication device 100 comprises a first encryption key stored in a non-volatile internal memory, reserved for this purpose. For example, the internal memory is integrated in a microcontroller circuit dedicated to a control unit of the communication device 100 so as to make access to the key impossible. This encryption key, referred to as a "root" key, is used for signing an authenticity certificate generated in the communication equipment 100, comprising a digest obtained from unique information on the communication device 100 and wherein the public key used for a future authentication is inserted. The first encryption key may have been programmed in the factory when the communication device 100 was manufactured or have been downloaded at the time of updating of the low-level software executed by a control unit of the communication device 100 and implementing, among other things, interconnection functions of the device, suitable for a network gateway between a LAN network and a WAN network. This low-level software is commonly referred to as "firmware". An implementation of a method according to the invention is described below. When a user of the configuration terminal 150, wishing to be able to perform a configuration of the communication device 100, in a secure fashion, that is to say while being capable of authenticating the communication device 100 in order to prevent an "identity" theft by a third-party device, and to encrypt the data flows between the configuration terminal 150 and the communication device 100, it ticks the entry box provided in the user graphical interface for the purpose of requesting that the data flows be made secure. A message representing this command is then transmitted to the web server embedded in the communication device 100, said message constituting a request with a view to securing exchanges between the communication device 100 and the remote configuration terminal 150. The request is stored in a buffer of the management interface embedded in the communication device 100 and dealt with immediately after by the control unit of the communication device 100 that manages a pair of keys $e_c$ and $d_d$ respectively public and private, for the encryption and deciphering of the data flows between the remote configuration terminal 150 and the communication device 100. The control unit next generates another pair of keys $e_a$ and $d_a$, respectively public and private, optionally chained with the first key known as a root key, able to be used respectively for authenticating the communication device 100. Thus, in accordance with the functioning of the public-key encryption systems used in asymmetric cryptography, if C is a predetermined encryption function and D is a predetermined deciphering function, then, for any message m in a data flow to be transmitted, m=C (D(m, $d_d$), $e_c$). A signature scheme is thus constructed from this cryptography system.

The signature of a message m is s=D(h(m), d) where h is a public hash function, resistant to collisions. The signature s can be verified by comparing h(m) with C(s,$e_c$).

According to a variant, a redundancy function may be used rather than a hash function. The authentication public key $e_a$ is integrated in an authentication certificate available for a user of the remote configuration terminal. A message is transmitted by the web server of the management interface of the communication device 100, which invites the user of the remote configuration terminal 150 to download this certificate $e_a$ with a view to subsequent use. The authentication certificate (comprising the authentication public key $e_a$) is next downloaded and recorded in a non-volatile memory of the remote configuration terminal 150.

According to a variant, the method is not limited to a chaining at a single level and may involve a chain of certificates, obtained iteratively from the previously created certificates, in order to reinforce the authentication procedure.

In a similar way, the encryption public key $e_c$ is transmitted to the remote communication terminal 150 in response to the message requesting that data flows be secured between the communication device 100 and the remote configuration terminal 150, previously sent by the configuration terminal 150. The encryption public key $e_c$ is also recorded in a non-volatile memory of the remote configuration terminal 150. The memory of the remote configuration terminal 150 where the authentication certificate $e_a$ created by the communication device 100 is recorded corresponds, for example, to a "certificate store" of the web browser of the configuration terminal 150.

The private keys $d_a$ and $d_d$ respectively necessary for the authentication of the configuration terminal 150 and/or of the communication device 100 and for the deciphering of the data flows between the remote configuration terminal 150 and the communication device 150 are for their part not transmitted, and are stored in a secure manner in the communication device 100. These keys are for example stored in a dedicated memory partition, or encrypted locally by means of a hardware encryption mechanism. For example, the hardware encryption may be performed by means of an encryption mechanism located and implemented in a dedicated component, the encrypted version of the key then being stored in a memory area that it is not possible to access directly, but only through the encryption/deciphering module of the key.

After reception and recording of the authentication certificate $e_a$ and of the encryption public key $e_c$, the data flows between the communication device 100 and the remote configuration terminal 150 can be secured.

The authentication certificate $e_a$ is created from one or more unique items of information on the communication device 100. Preferentially, the authentication certificate $e_a$ is created from a large number of elements tending to confer a unique character on the authentication certificate $e_a$. The unique information used for generating the authentication certificate $e_a$ is, by way of non-limitative examples: a serial number of the communication device 100, one or more unique identifiers of electronic components implemented in the hardware architecture of the communication device 100, a code representing a country of use and/or a region of use of the communication device 100, an IP address seen from the WAN network 10, an MAC address of a network interface of the communication device 100, or a string of characters representing a contact email stored in a memory area of the communication device 100.

According to a variant of the embodiment, information entered by the user of the remote configuration terminal 150 prior to the generation of the authentication certificate $e_a$ is used for generation thereof. This information is, for example, responses to predetermined questions. In the case where the establishment of the authentication certificate $e_a$ uses information liable to change, such as an IP address, for example, a new certificate will have to be generated. Each new certificate will require having to implement the securing method according to the invention.

According to a second embodiment of the invention, a chaining of certificates with two or more levels is performed. Thus a first authentication certificate known as a "root authentication certificate" or "root certificate" is created and an authentication certificate known as a "service certificate", chained with the root certificate, is created for managing the configuration. According to this variant, it is the service certificate that will then be transmitted to the remote configuration terminal 150 after reception of a message requesting the securing of the data flows by the communication device 100.

According to the invention, it is essential for the steps of reception of a request with a view to securing the data flows between the communication device 100 and the remote configuration terminal 150, sent by the remote configuration terminal 150, and of sending of the public key $e_a$ that can be used with a view to authentication, are performed when the two devices are connected to the same private local network. This is because this feature guarantees the authenticity of the certificate and of the subsequent use thereof. A connection to the same private local network means a unicast connection preserved from an intrusion or from an interception of data by the use of a third-party device. Such a connection of the two devices, the communication device 100 and the remote communication terminal 150, to the same private local network is for example made by means of a physical link using a communication in accordance with an Ethernet protocol or any one of the updates thereof, or a connection secured and encrypted through a secure wireless private local network.

Advantageously, and by virtue of the implementation of the method according to the invention, it is possible to initiate secure communications, using for example the HTTPS protocol, immediately after the execution of the method according to the invention, or subsequently, with the remotely configurable terminal connected to the communication device outside the same private local network. Advantageously again, the communication device is configured natively (on leaving the factory) in order not to allow a remote configuration by means of its interface for connection to the WAN network 10, and the transmission of a public key from the communication device 10 to the configuration terminal 150 is accompanied by a reconfiguration of the communication equipment 100 aimed at allowing a subsequent remote configuration by means of its interface for connection to the WAN network 10, from the data flow encrypted by the public key transmitted.

Exchanges using the HTTPS protocol can then be made when the remote configuration terminal 150 is for example connected to another private network LAN, connected to the extended network WAN 10 through a gateway other than the communication device 100.

Thus, when the remote-configuration terminal 150 is connected to any internet branch, it can establish an encrypted connection with the communication device 100 by means of its web browser application and the web server embedded in the communication device 100. The connection is established using the IP address of the communication device 100 and a port number dedicated to secure exchanges, that is to say using a domain name resolved by a server with a domain name translating the domain name into an IP address. The remote configuration terminal 150 then checks the authenticity of the communication device 100 using the authentication certificate signed by the root key (the first key), and the public key $e_a$. The authentication of the communication device 100 by the remote configuration terminal 150 uses a decryption of an encrypted digest inserted in the certificate transmitted to the remote configuration terminal 150, by means of the public key itself inserted in the certificate. The digest is a digital fingerprint obtained by a hash function. When the communication device 100 is authenticated, the deciphered digest is compared with the digests obtained from unique information relating to the communication device 100. If the two digests are identical, then it is considered that the authentication certificate is authentic, that is to say it was indeed signed by the root key of the communication equipment 100. Once the communication device 100 is authenticated by the remote configuration terminal 150, an encrypted communication channel is used between the configuration terminal 150 and the communication device 100. To do this, the data flows to be transmitted are encrypted by means of the public key $e_c$ before sending to the communication device 100 and deciphered on reception, by the communication device 100 using the private key $d_d$.

Figure 2:
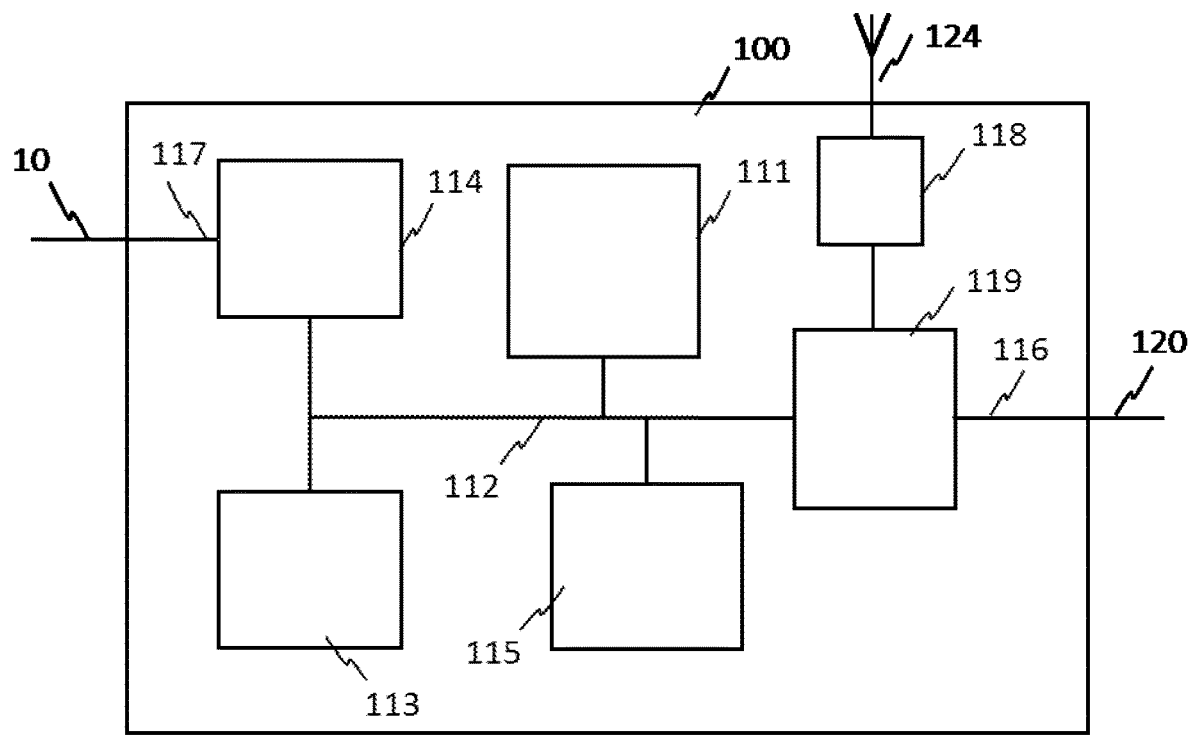
FIG. 2 is a schematic representation of the architecture of the communication device already shown in FIG. 1.

FIG. 2 illustrates the internal architecture of the communication equipment 100 configured to perform network gateway functions between the WAN network 10 and the LAN network 120. The communication device 100 comprises a control unit 111. The control unit 111 comprises electronic circuitry configured to perform normal gateway functions between two networks. According a preferred embodiment of the invention, the control unit comprises a microprocessor. The control unit 111 is connected to a non-volatile memory module 113 by means of a shared bus 112. The memory module 113 comprises memory areas dedicated to the storage of software codes executable in correspondence with the functions implemented by the communication equipment 100. A random access memory module 115 is also connected to the control unit 111 by means of the shared bus 112, and serves in particular for executing the aforementioned software codes. The control unit 111, the non-volatile memory module 113 and the random access memory module 115 are therefore connected together by the shared bus 112, to which an interface 119 for connection to a LAN network and an interface 114 for connection to an extended network WAN are also connected. The connection interface 119 is for example a cabled interface of the Ethernet type. Such an Ethernet interface brings a high level of security, in particular when the remote configuration terminal 150 is directly connected to the communication equipment 100 by means of this interface using a cable. The interface 119 for connection to a LAN network is moreover connected to a wireless communication module 118 comprising the antenna system 124. Such an interface also brings a high level of security, when a direct connection is established with the remote configuration terminal 150, by means of an encryption. The non-volatile memory module 113 comprises a set of areas dedicated to the configuration of the communication equipment 100. These areas contain parameter values useful to the configuration of the communication equipment 100 according to several operating modes. Each of the parameters can be modified by rewriting the corresponding non-volatile memory area. Modification of a parameter is achievable under the control of the control unit 111, in particular when the control unit executes the management interface for the configuration of the communication equipment 100.

When the control unit 111 implements the interface managing the configuration of the communication equipment 100, it performs web server functions adapted for displaying a web page, dedicated to configuration, on a remote terminal such as the configuration terminal 150 connected to the communication device 100 by means of the connection interface 119 (LAN network) or the connection interface 114 (WAN network). According to a preferred embodiment of the invention, the communication equipment 100 is configured natively so that the remote configuration can be achieved only via the network interface 119 or the network interface 118 using a secure (encrypted) communication, and this until the execution of the method for securing data flows according to the invention. In other words, the remote configuration of the communication equipment 100 through a WAN network connected to the WAN network interface is inhibited at the time of configuration of the network gateway in the factory, or when there is a return to a so-called "factory" configuration.

The communication equipment 100 is thus adapted for executing the method for securing data flows according to the invention.

Figure 3:
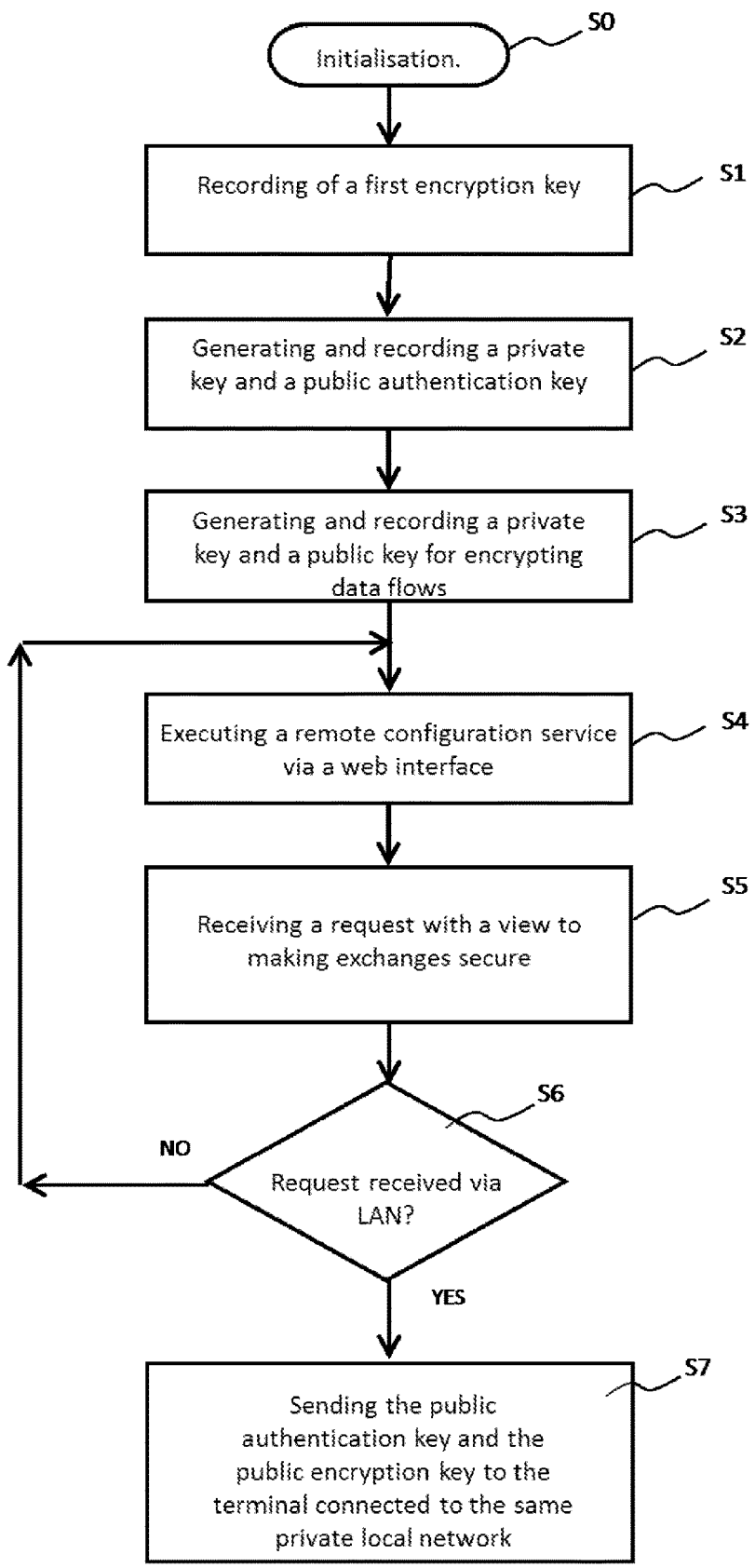
FIG. 3 is a diagram depicting a method for securing data flows according to the invention, implemented by the communication device already shown in FIG. 1 and FIG. 2.

FIG. 3 is a flow diagram illustrating a method for securing data flows between the communication equipment 100 and the remote configuration terminal 150 according to a particular and non-limitative embodiment of the invention. A general initialisation of the communication device 100 takes place in a step S0. At the time of this general initialisation, the communication device 100 is configured to be able to perform a set of functions useful to the implementation of a network gateway between a first LAN network connected to the network interface 119, and a second LAN or WAN network connected to the network interface 117. At the end of this step, the communication equipment is able, after a startup phase, to perform network gateway functions and to execute a remote configuration management interface by the implementation of a configuration web server, accessible via the LAN network connection interface 119. At this stage, the communication equipment 100 cannot be configured remotely in a secure manner by means of its network interface 114, this capability being natively inhibited. A recording of a first encryption key, referred to as a root key, is performed during a step S1. According to an embodiment of the invention, this recording is performed at the time of manufacture in the factory. According to a variant, this root-key recording is performed by downloading, during a secure configuration operation subsequent to manufacture, such as a maintenance operation for example.

A first generation of a pair of private/public keys is next performed in a step S2, as well as a second generation of private/public keys in a step S3. The first pair of keys is provided for authentication operations and the second pair of keys is provided for encryption operations. These generations of pairs of public and private keys are performed, for example, when the communication equipment 100 is first powered up or subsequently during a configuration, reconfiguration or maintenance operation.

An execution of the configuration management interface takes place in a step S4, when the remote configuration terminal 150 connects to the web server configuring the communication equipment 100, via the network interface 119. This execution is performed by the exchange of protocol messages, for example according to the HTTP protocol, and allows the display of a web page for configuring the communication equipment 100 on a screen of the configuration terminal 150. The configuration web page is adapted to use configuration menus, allowing the definition of configuration parameters stored in configuration registers of the communication equipment 100 or in non-volatile memory areas dedicated to this purpose. Typically, the web page makes it possible, for a user manipulating the remote configuration terminal 150, to choose parameters and to adjust the respective values thereof. According to a preferred embodiment of the invention, the configuration web page also makes it possible to activate or deactivate functions by ticking boxes associated with a description of the function. Thus the web page comprises a function that can be activated by ticking a box and is entitled "Securing of data flows for remote configuration".

When a user of a remote configuration terminal 150 seeks the activation of the securing of the data flows between the remote configuration terminal 150 and the communication equipment 100, by ticking the box on the configuration web page, the configuration terminal 150 sends an HTTP request to the communication equipment 100, with a view to seeking the securing of the subsequent exchanges by operations of authentication and encryption of the data flows, until a reconfiguration possibly once again enables non-secured exchanges.

The request with a view to securing the data flows is then received by the communication equipment in a step S5.

Cleverly, the communication equipment 100 tests, as soon as the request with a view to securing the data flows between the remote configuration equipment and itself is received, whether the request has been received via the LAN network interface 119 or the WLAN network interface 118, or via the network interface 114, which can be used for a connection to an extended network of the WAN type.

If the request was received by means of the LAN network interface 119, and by means of an Ethernet port 116, that is to say by a cable connection representing a high security level, the communication equipment 100, in response to the request, transmits the public encryption and authentication keys to the remote configuration terminal 150. In the contrary case, the communication equipment does not transmit the public keys and addresses an error message via the web page of the configuration management interface, aimed at indicating that securing the data flows is not possible.

According to a variant of the embodiment, the communication equipment 100 tests, in the case where the request with a view to securing the data flows has not been received via the LAN network interface 119 and the Ethernet port 116, whether the request was received via the WLAN network interface 118 making encrypted exchanges with the remote configuration terminal 150. According to this variant, the communication equipment 100 considers that the exchanges with the configuration terminal 150 are made with a sufficiently high security level and, in response to the request, transmits the public encryption and authentication keys to the remote configuration terminal 150. Failing this, the configuration equipment addresses an error message via the web page of the configuration management interface, aimed at indicating that securing the data flows is not possible.

In the case where the securing of the data flows is not permitted and the public keys are not sent, the communication equipment positions itself to await a new remote configuration request. This new request may be a request aimed at securing the data flows or another configuration request.

Apart from the transmission of the public encryption and authentication keys, the communication equipment 100 is reconfigured, under the control of the control unit 111 performing the method according to the invention, so as to enable a remote configuration by means of the network interface 114, configurable for a connection to an extended network of the WAN type.

According to a variant of the embodiment of the invention, the public authentication and encryption keys are also transmitted to a remote storage device such as the storage device 11, configured for storing public encryption keys. The remote storage device is furthermore configured to establish a secure remote connection with a remote configuration terminal not having public authentication and encryption keys and configured to download these keys from the storage device 11.

Advantageously, the transmission of the authentication and encryption public keys to the remote configuration terminal 150 enables the remote configuration terminal 150 to authenticate the communication equipment when there is a subsequent connection and to encrypt the data flows to the communication equipment 100, so as to prevent any attack of the man-in-the-middle attack type during remote configuration operations.

According to one embodiment of the invention, the certificate or certificates transmitted to the remote configuration terminal 150, and the public key or keys relating thereto, may be revoked and a new execution of the securing method according to the invention is then required and made possible by means of the graphical configuration interface implemented by the web server of the communication device 110. Advantageously, a reconfiguration of the IP address of the communication device 100 or a modification of the parameters of a dynamic DNS server targeted by the communication device 100 gives rise to a further performance of the method for securing the data flows according to the invention.

According to one embodiment of the invention, a reconfiguration to factory settings does not delete the certificate or certificates transmitted, nor the public key or keys transmitted, and a dedicated command makes it possible to proceed with deletion thereof, independently of a reconfiguration to factory settings.

According to one embodiment of the invention, all the parameters may be saved on a medium internal or external to the communication device 110 and comprise the certificate or certificates, as well as the public key or keys transmitted.

The invention is not limited solely to the embodiments described above and applies more generally to any method for securing data flows in a communication device configurable from a remote terminal, the method comprising steps of recording a first encryption key in a memory of the device, the generation, in the communication device, from the first key, of a public key and of a private key corresponding to the public key, and then the reception of a request for securing made by the remote terminal and a sending of the public key from the communication device to the remote terminal, in response to the request for securing, the operations of receiving the request and sending the public key necessarily being performed when the device and the terminal are connected to the same private local network. The invention relates to any device implementing such a method.

The invention claimed is:

1. A method for securing a data flow between a communication device and a remote terminal, said communication device comprising a first communication interface for a connection to a first local network of the LAN type, and a second communication interface for a connection to a second network, said device being configurable from the remote terminal, wherein the method comprises:
   recording, by said communication device, a first key in a memory of said device,
   generating and recording, by said device, a second encryption key, referred to as a private key, and a third encryption key, referred to as a public key, the public key being inserted in an authenticity certificate signed by the first key, the public key being able to be used for the encryption of a data flow that can be deciphered by means of the private key,
   receiving, from the remote terminal, a request with a view to securing data flows between said communication device and the remote terminal,
   checking that said request is received via said first interface for a connection to a first local network of the LAN type, and
   if said request is received via said first interface for a connection to a first local network of the LAN type, sending, by said communication device, the public key to the remote terminal, in response to the request, and enabling remote configuration of said communication device via at least said second interface from the data flow encrypted by means of said public key.

2. The method according to the claim 1, the method comprising authenticating said device vis-à-vis the remote terminal or vice versa.

3. The method according to claim 1, the method comprising encrypting a data flow to be transmitted between said device and the remote terminal, the encryption being performed by means of said public key.

4. The method according to claim 1, the step of sending the public key to the remote terminal further comprising a sending of the public key to a remote storage device.

5. A communication device configurable from a remote terminal, said communication device comprising a first communication interface for a connection to a first local network of the LAN type, and a second communication interface for a connection to a second network, wherein said communication device is configured for:
   recording a first key in a memory of said device,
   generating and recording a second encryption key, referred to as a private key, and a third encryption key, referred to as a public key, said public key being inserted in an authenticity certificate signed by the first key, the public key being able to be used for the encryption of a data flow that can be deciphered by means of the private key,
   receiving, from the remote terminal, a request with a view to secure exchanges between said communication device and the remote terminal,
   checking that said request is received via said first interface for a connection to a first local network of the LAN type, and
   if said request is received via said first interface for a connection to a first local network of the LAN type, sending, by said communication device, the public key to the remote terminal, in response to the request and enabling a remote configuration of said communication device via at least said second interface from data flows encrypted by means of the public key.

6. The communication device according to claim 5, said device being intended for executing connection gateway functions between said local network of the LAN type and an extended network of the WAN type.

7. The communication device according to claim 5, configured to make a modification of at least one configuration register from received data encrypted by the execution of an encryption algorithm using the public key and decipherable by the execution of a deciphering algorithm using the private key.

8. The communication device according to claim 5, configured for implementing a web server allowing modification of at least one configuration register via the use of a graphical interface displayed on the remote terminal.

9. The communication device according to claim 8, wherein the graphical interface is adapted for entering a command for securing data flows between said communication device and the remote terminal.

10. A communication system comprising a remotely configurable communication device and a configuration terminal, said communication device comprising a first communication interface for a connection to a first local network of the LAN type, and a second communication interface for a connection to a second network, said communication device being configurable from the remote terminal, said device and the configuration terminal being configured for being connected to the same network and for:

recording, by said communication device, a first encryption key in a memory of said device, generating and recording, by said device, a second encryption key, referred to as a private key, and a third encryption key, referred to as a public key, the public key being inserted in an authenticity certificate signed by the first key, the public key being able to be used for the encryption of a data flow that can be deciphered by means of the private key, receiving, by said communication device and from the configuration terminal, a request with a view to securing exchanges between said communication device and the configuration terminal, checking, by the device, that the request is received via said first interface for a connection to the first local network of the LAN type, if said request is received via said first interface for a connection to a first local network of the LAN type, sending, by said communication device, the public key to the remote terminal, in response to the request, and enabling a remote configuration of said device via at least said second interface from data flows encrypted by means of said public key.

11. A nontransitory information storage medium embodying a computer program product comprising program code instructions for executing the steps of the method according to claim 1, when said computer program product is executed on a computer.

* * * * *